US007007127B2

(12) United States Patent
Lin

(10) Patent No.: US 7,007,127 B2
(45) Date of Patent: Feb. 28, 2006

(54) METHOD AND RELATED APPARATUS FOR CONTROLLING TRANSMISSION INTERFACE BETWEEN AN EXTERNAL DEVICE AND A COMPUTER SYSTEM

(75) Inventor: Hao Hsing Lin, Taipei Hsien (TW)

(73) Assignee: ALI Corporation, Hsi-Chih (TW)

( * ) Notice: Subject to any disclaimer, the term of this patent is extended or adjusted under 35 U.S.C. 154(b) by 815 days.

(21) Appl. No.: 10/063,775

(22) Filed: May 11, 2002

(65) Prior Publication Data

US 2003/0163628 A1    Aug. 28, 2003

(30) Foreign Application Priority Data

Feb. 27, 2002  (TW) .............................. 91103699 A

(51) Int. Cl.
*G06F 13/00* (2006.01)
(52) U.S. Cl. ...................... 710/315; 710/315; 710/313; 710/105; 710/33; 710/66; 710/72
(58) Field of Classification Search ........ 710/305–315, 710/104–106, 33–36, 62–64, 72–74
See application file for complete search history.

(56) References Cited

U.S. PATENT DOCUMENTS 6,006,295 A * 12/1999 Jones et al. .................... 710/62
6,199,122 B1 * 3/2001 Kobayashi .................... 710/36
6,505,267 B1 * 1/2003 Luke et al. .................. 710/315
6,523,081 B1 * 2/2003 Karlsson et al. ............. 710/305
6,526,515 B1 * 2/2003 Charles et al. .............. 713/300
6,718,424 B1 * 4/2004 Cruz ........................... 710/315
6,785,760 B1 * 8/2004 Asselin ....................... 710/315
6,845,422 B1 * 1/2005 Shimada et al. ............. 710/305
2001/0013079 A1 * 8/2001 Luke et al. .................. 710/129
2003/0154340 A1 * 8/2003 Bolt et al. .................... 710/305
2005/0060479 A1 * 3/2005 Deng et al. .................. 710/306

* cited by examiner

*Primary Examiner*—Christopher Shin
(74) *Attorney, Agent, or Firm*—Winston Hsu

(57) ABSTRACT

A method and a related apparatus for controlling a transmission interface between a computer system and an external device is disclosed. The external device includes a bridge circuit for controlling the transmission interface of the external device, a driver circuit for controlling the external device according to outputs of the bridge circuit, and a memory connected to the driver circuit for storing transmission interface data. Before the computer system obtains the transmission interface data, the bridge circuit transmits a control command to the driver circuit such that the driver circuit retrieves the transmission interface data stored in the memory, and transmits the transmission interface data to the computer system such that the computer system can properly transmit data to the bridge circuit according to the transmission interface data.

22 Claims, 3 Drawing Sheets

METHOD AND RELATED APPARATUS FOR CONTROLLING TRANSMISSION INTERFACE BETWEEN AN EXTERNAL DEVICE AND A COMPUTER SYSTEM

BACKGROUND OF INVENTION

1. Field of the Invention

The present invention relates to a method and a related apparatus for controlling transmission interface between an external device and a computer system, and more particularly, to a method and a related apparatus which embeds transmission interface data in a device configuration data of the external device.

2. Description of the Prior Art

With advanced development of computer technology, the size of a computer system is gradually being reduced. The computer system is now used in a broad spectrum of fields. In order to expand additional functions of the computer system to meet requirements of different users, many kinds of external devices are invented under this situation. For example, an external hard disk drive or other portable data storage devices can increase the total data storage capacity of the computer system. An external optical drive and an external optical recordable drive can provide the computer system with an additional ability of accessing multimedia data recorded on compact disks and storing a great quantity of back-up data on the compact disk. In addition, an IC smart card and an external network card can individually provide other functions to make the computer system become a more powerful tool for users.

If the external devices are designed to expand functions of the computer system, the external devices must be able to communicate with the computer system for transferring data. Please refer to FIG. 1, which is a block diagram of a standard computer system 10 connected to prior art external devices 20A, 20B. The computer system 10 has a host 11 which comprises a central processing unit (CPU) 12A, a north bridge circuit 12B and a south bridge circuit 12C, a video graphics array (VGA) card 12D, a monitor 12E, a memory 12F, a soundcard 14A, a speaker 14D, an input device 14B, a hard disk drive 14C, and a connecting port 14E.

The computer system 10 usually has a plurality of external devices connected to the same host 11. The connecting port 14E, therefore, has a plurality of first connecting terminals. For clarity, there are only two first connecting terminals 16A, 16B shown in FIG. 1. Each of the first connecting terminals 16A, 16B corresponds to an external device. As shown in FIG. 1, the first external device 20A is connected to the host 11 through the first connecting terminal 16A, and the second external device 20B is connected to the host 11 through the second connecting terminal 16B. Taking the first external device 20A as an example, the structure and operation of the prior art external device is further described as follows. The first external device 20A has a second connecting terminal 18A corresponding to the first connecting terminal 16A. Furthermore, the first external device 20A has a transmission interface controller 22, a driver circuit 24B, a non-volatile memory 26B, and a kernel module 29. The transmission interface controller 22 has a bridge circuit 24A and a non-volatile memory 26A. The kernel module 29 is used for actually performing a predetermined function of the first external device 20A. For example, if the first external device 20A is an external hard disk drive, the kernel module 29 is the physical storage disk used for recording data. If the first external device 20A is an external optical drive, the kernel module 29 comprises a pick-up head and a motor for rotating the disk, etc. Similarly, if the first external device 20A is an external memory card, the kernel module 29 is a flash memory. The driver circuit 24B is used for controlling operation of the kernel module 29. The memory 26B electrically connected to the driver circuit 24B is used for storing device configuration data 28B of the first external device 20A, that is, the configuration information associated with the kernel module 29. For example, if the first external device 20A is an optical drive, the device configuration data 28B comprises information about direct memory access (DMA). If the first external device 20A is an external hard disk drive, the device configuration data 28B comprises information about parameters such as capacity, cylinders, and sectors. The host 11 must obtain the device configuration data 28B to control external devices 16A, 16B through the transmission interface controller 22.

In order to make different kinds of external devices suitable for the host 11, a plurality of connecting port standards are defined to meet different requirements. However, different specifications are not compatible with each other. The host 11 may adopt a universal serial bus (USB) specification (first format), but the external devices 16A, 16B may adopt another connecting port specification (second format). If the first external device 20A is an external hard disk drive, the first external device 20A requires commands compatible with an AT attachment (ATA) specification to control the driver circuit 24B. Similarly, if the first external device 20A is an external optical drive, the first external device 20A requires commands compatible with an ATA packet interface (ATAPI) specification to control the driver circuit 24B. Data compatible with the first format have a different structure and a different electronic character compared with the data compatible with the second format. The bridge circuit 24A, therefore, is necessary to convert data transmitted between the connecting port 14E and the driver circuit 24B. The bridge circuit 24A has a first port 25A for receiving and outputting data compatible with the first format and a second port 25B for receiving and outputting data compatible with the second format. The bridge circuit 24A can transform the data compatible with the first format (USB for example) into data compatible with the second format (ATA or ATAPI for example). That is, when the host 11 wants to control the first external device 20A, the host 11 will output commands compatible with the first format (signal S1 shown in FIG. 1) through the connecting port 14E to the first external device 20A. The bridge circuit 24A of the first external device 20A will analyze the signal S1 to retrieve the original commands, and transmits the commands compatible with the second format (signal S2 shown in FIG. 1) from the second port 25B to the driver circuit 24B. The driver circuit 24B then can control the kernel module 29 to perform some actions such as retrieving data according to the commands generated from the host 11. On the other hand, the data transferred from the kernel module 29 and the driver circuit 24B to the host 11 will first be transmitted to the second port 25B of the bridge circuit 24A according to the second format, and the bridge circuit 24A then transforms the received data into data compatible with the first format. Finally, the data compatible with the first format are outputted from the first port 25A and are passed through the second connecting port 18A and the first connecting port 16A to arrive at the connecting port 14E. The host 11, therefore, can now conveniently exchange data with the external devices 20A, 20B through the transmission interface controller 22.

In addition to the above-mentioned signal format transformation, the transmission interface controller 22 further uses a non-volatile memory 26A to store the transmission interface data 28A. The transmission interface data 28A comprises unique identification data associated with the bridge circuit 24 such as a vendor identity code, a product identity code, manufacturer information, a serial number code, and so forth. As mentioned above, the many external devices nowadays can simultaneously attach to only one computer host, and the specific transmission interface data of each external device are used for identifying individual external devices so that the host can control those external devices through the connecting port. In other words, when the host wants to transmit a command to a specific external device, the host can assign unique transmission interface data associated with the desired external device at the same time so that the command will only be received by the external device compatible with the assigned transmission interface data.

To sum up, when the host 11 starts operating (power-on), the host 11 will search any external devices connected to the connecting port 14E. If there are external devices connected to the connecting port 14E (the first external devices 20A, 20B shown in FIG. 1), the host 11 will ask every first external device 20A, 20B to hand over corresponding transmission interface data to the host 11. Taking the prior art first external device 20A as an example, when the bridge circuit 24A receives the request from the host 11, the bridge circuit 24A will retrieve the transmission interface data 28A from the memory 26A and transmit the transmission interface data 28A to the host 11. After the host 11 receives the transmission interface data of each external device, the host 11 can exchange data with the external devices by assigning specific transmission interface data to select a corresponding external device. If the host 11 wants to control operation of the external devices, the host 11 will require the device configuration data of each external device. Taking the first external device 20A as an example again, when the bridge circuit 24A receives the request from the host 11, the bridge circuit 24A will transmit an "identify driver" command compatible with the second format (ATA or ATAPI) to the driver circuit 24B, and the driver circuit 24B will retrieve and transmit the device configuration data 28B to the bridge circuit 24A. Then, the bridge circuit 24A transmits the device configuration data 28B compatible with the first format to the host 11. After the host 11 gets the device configuration data 28B, the host 11 can control operation of the external device with adequate parameters and commands according to the device configuration data 28B.

The principal drawback mentioned above is that the driver circuit 24B and the transmission interface controller 22 respectively need memory 26B, 26A to store device configuration data 28B and the transmission interface data 28A. The device configuration data 28B are related to parameters required by the operation of the first external device 20A, and the transmission interface data 28A are related to control of the transmission interface between the host 11 and the first external device 20A. Both data must be stored in non-volatile memory. The prior art computer system uses two non-volatile memory 26A, 26B to store the device configuration data 28B and the transmission interface data 28A respectively. The non-volatile memory such as an electrically erasable programmable read-only memory (EEPROM) or a flash memory has a special structure compared with an ordinary logic circuit, and requires a special circuit design to work properly. Therefore, the production cost is high. In other words, the prior art transmission interface controller of the external device has a high production cost and a complicated circuit design.

SUMMARY OF INVENTION

It is therefore a primary objective of the claimed invention to provide a method and a related apparatus for controlling transmission interface between an external device and a computer system with a simple circuit design to solve the above mentioned problem.

Briefly, the claimed invention provides a method for controlling a transmission interface between a computer system and an external device to manage data transmission. The computer system comprises a host for controlling operation of the computer system, and a first connecting port for outputting and receiving a data compatible with a first format. The external device comprises a second connecting port for receiving the data compatible with the first format transmitted from the first connecting port and transmitting the data compatible with the first format to the first connecting port, a bridge circuit comprising a first port and a second port, a driver circuit for controlling operation of the external device according to the data compatible with the second format outputted from the second port of the bridge circuit, and a memory electrically connected to the driver circuit for storing transmission interface data. The first port is electrically connected to the second connecting port. The bridge circuit transforms the data compatible with the first format received by the first port into corresponding data compatible with a second format and outputs the data compatible with the second format through the second port. The bridge circuit transforms the data compatible with the second format received by the second port into the corresponding data compatible with the first format and outputs the data compatible with the first format through the first port. The host of the computer system transmits the data compatible with the first format to the bridge circuit of the external device according to a specification defined by the transmission interface data. The bridge circuit transmits a control signal compatible with the first format to the driver circuit for retrieving the transmission interface data stored in the memory, and the bridge circuit transmits the transmission interface data compatible with the first format to the host so that the host transmits data compatible with the first format to the bridge circuit according to the transmission interface data.

It is an advantage of the claimed invention that the transmission interface data are embedded in the original reserved data space of the device configuration data. The device configuration data and the transmission interface data are both stored in the same non-volatile memory of the driver circuit. Therefore, there is no need to install an extra non-volatile memory in the transmission interface controller. When the host requests the transmission interface data, the transmission interface controller will issue an "identify driver" command compatible with the second format to the driver circuit. The transmission interface data are retrieved from the reserved data space of the device configuration data. The claimed invention, briefly summarized, discloses a transmission interface controller with a simple circuit design and a low production cost.

These and other objectives of the claimed invention will no doubt become obvious to those of ordinary skill in the art after reading the following detailed description of the preferred embodiment which is illustrated in the various figures and drawings.

DETAILED DESCRIPTION

Figure 1:
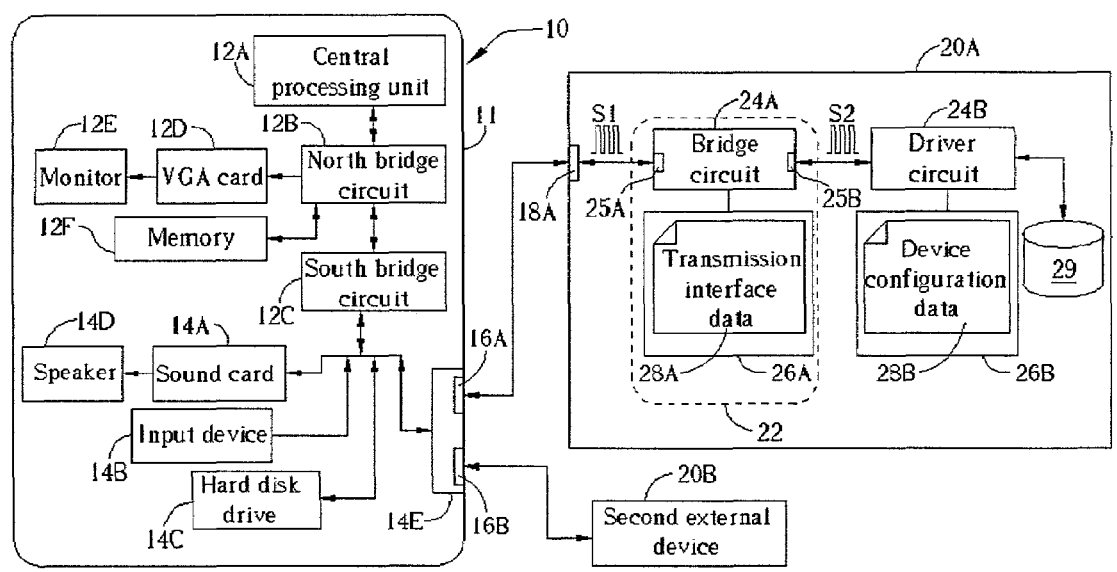
FIG. 1 is a block diagram of a standard computer system connected to prior art external devices.
Figure 2:
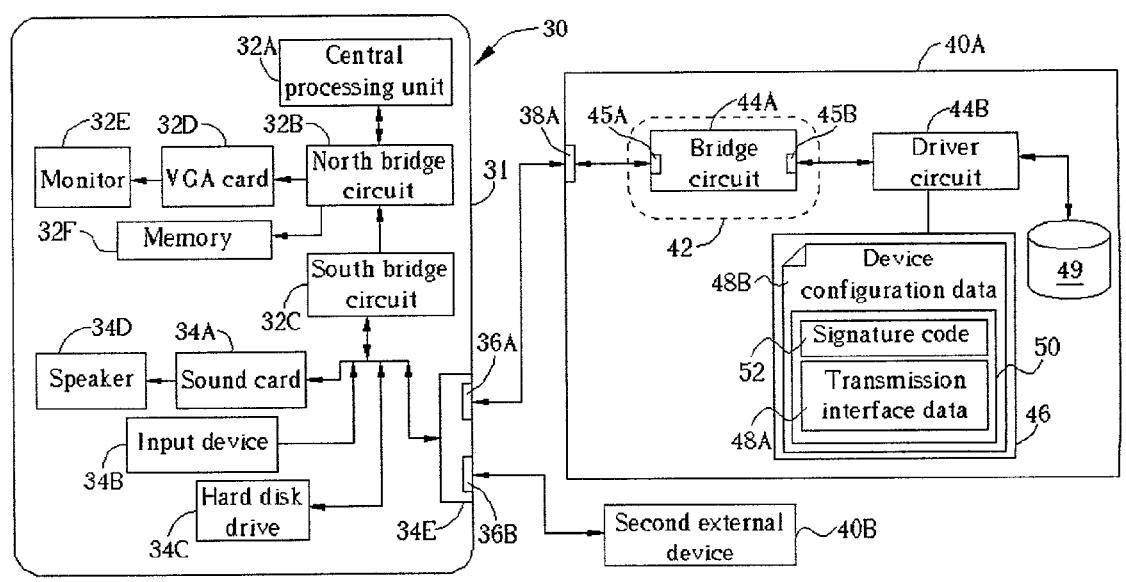
FIG. 2 is a block diagram of a computer system connected to external devices according to the present invention.

Please refer to FIG. 2, which is a block diagram of a computer system 30 connected to external devices 40A, 40B according to the present invention. The computer system 30 has a host 31 which comprises a central processing unit 32A, a north bridge circuit 32B, a south bridge circuit 32C, a VGA card 32D, a monitor 32E, a memory (a volatile data storage device) 32F, a soundcard 34A, a speaker 34D, an input device 34B, a hard disk drive (a non-volatile data storage device) 34C, and a connecting port 34E. The connecting port 34E (a USB connecting port for example) of the computer system 30 has a plurality of first connecting terminals 36A, 36B (only two connecting terminals are drawn in FIG. 2 for clarity) corresponding to a first external device 40A and a second external device 40B respectively. Besides, signals compatible with the first format (USB signals for example) are transmitted from the connecting port 34E to the external devices 40A, 40B.

Taking the first external device 40A as an example, the general structure of the external device according to the present invention is further described as follows. The first external device 40A has a second connecting terminal 38A, a transmission interface controller 42, a driver circuit 44B, a non-volatile memory 46 electrically connected to the driver circuit 44B, and a kernel module 49. Like the prior art first external device 20A, the kernel module 49 is used for performing the actual predetermined function of the first external device 40A, and the driver circuit 44B is used for controlling operation of the kernel module after receiving commands or signals compatible with the second format (ATA or ATAPI for example). In order to bridge the signals with different formats, the transmission interface controller 42 has a bridge circuit 44A. The bridge circuit 44A has a first port 45A and a second port 45B. The bridge circuit 44A can transform signals compatible with the first format into signals compatible with the second format. The signals or data compatible with the second format are received and outputted through the second port 45B. Similarly, the signals or data compatible with the first format are received and outputted through the first port 45A.

Being analogous to the prior art first external device 20A, the host 31 needs the transmission interface data provided by the external devices to exchange data with the external devices correctly. In addition, the non-volatile memory 46 of the driver circuit 44B stores the device configuration data 48B to record parameters and information associated with operation of the kernel module 49. Generally speaking, the specification of the second format (ATA or ATAPI) specially defines a reserved data space allocated at the device configuration data so that the manufacturer of the external device can utilize the reserved data space to store additional information. The device configuration data 48B shown in FIG. 2, for example, has a reserved data space 50. The prior art host does not need the information stored in the reserved data space when the external device is operating because the information stored in the reserved data space according to the prior art has nothing to do with the operation of the external device. But, the major difference between the prior art and the present invention is that the present invention uses the reserved data space 50 of the device configuration data 48B to store the essential transmission interface data 48A. Because the capacity of the reserved data space 50 is larger than the size of the transmission interface data 48A, the reserved data space 50 is suitable for storing the transmission interface data 48A undoubtedly. In order to check the transmission interface data 48A in the reserved data space 50, the reserved data space 50 further has a signature code 52. Because the transmission interface data 48A are embedded in the device configuration data 48B, the transmission interface controller 42, therefore, needs an extra non-volatile memory to keep the transmission interface data 48A no more.

As mentioned above, when the host 31 starts establishing connection with the first external device 40A, the host 31 must request the first external device 40A to give the transmission interface data. After receiving the request from the host 31, the bridge circuit 44A will issue an "identify driver" command compatible with the second format to the driver circuit 44B for retrieving the device configuration data 48B. When the bridge circuit 44A receives the device configuration data 48A read from the memory 46, the bridge circuit 44A can extract the corresponding transmission interface data 48A from the reserved data space 50 of the device configuration data 48A, and transmits the transmission interface data 48A to the host 31. The host 31 can correctly establish connection with the first external device 40A according to the transmission interface data 48A, and starts exchanging data with the first external device 40A now. In other words, the first external device 40A can perform its predetermined function to help the computer system 30. Please refer to FIG. 3, which is a flow chart diagram illustrating the connection establishment between the host 31 and the first external device 40A. The related steps are described as follows.

Step 62: Start.

Figure 3:
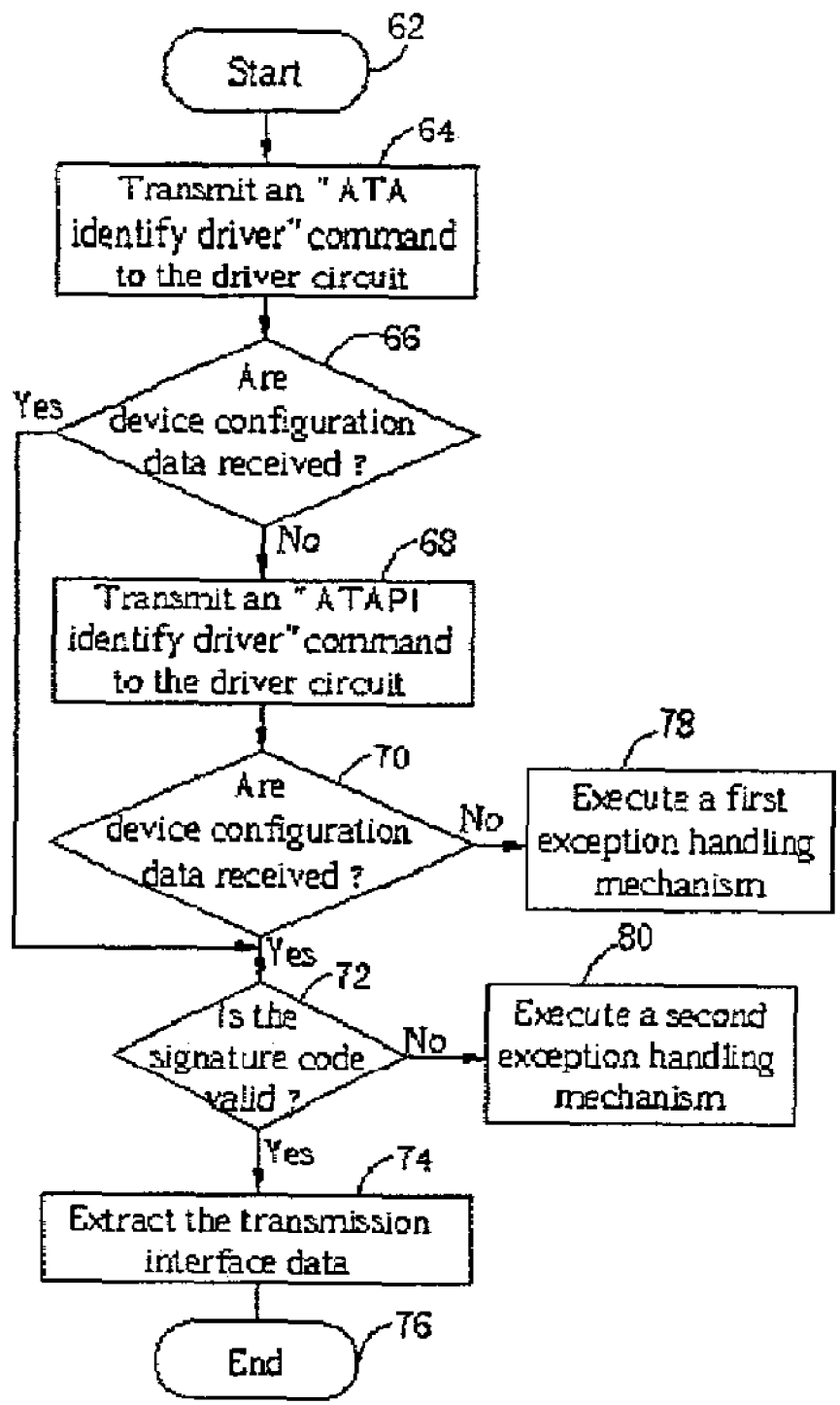
FIG. 3 is a flow chart diagram illustrating the connection establishment between the host and the first external device.

When the host 31 is going to establish connection with the first external device 40A, the procedures shown in FIG. 3 are executed step by step. As mentioned above, when the host 31 is powered on, the host 31 will detect whether there are external devices connected to the host 31. If an external device is connected to the connecting port of the host 31, the host 31 will request the external device to give its transmission interface data. The request from the host 31 is compatible with the first format to be transmitted to the bridge circuit 44A of the first external device 40A through the first connecting terminal 36A and the second connecting terminal 38A.

Step 64:

After receiving the request from the host 31, the bridge circuit 44A issues an "ATA identify driver" command to the driver circuit 44B. The "ATA identify driver" command has been defined by an ATA specification to drive the driver circuit 44B to read the device configuration data 48B from the memory 46. Then, the device configuration data 48B is transmitted to the bridge circuit 44A by the driver circuit 44B.

Step 66:

The bridge circuit 44A checks whether the driver circuit 44B has transmitted the device configuration data 48B to the bridge circuit 44A. If the bridge circuit 44A has received the device configuration data 48B, go to step 72; otherwise, go to step 68.

Step 68:

The bridge circuit 44A issues an "ATAPI identify driver" command to the driver circuit 44B. Concerning the preferred embodiment of the present invention, the first external device 40A is an external hard disk drive or an external optical drive. The driver circuit of the external hard disk drive needs the "ATA identify driver" command to read and pass the device configuration data. The driver circuit of the external optical drive needs the "ATAPI identify driver" command to read and pass the device configuration data. The driver 44B does not respond to the "ATA identify driver" command in step 66, which means that the driver circuit and the kernel module might belong to the external optical drive. Therefore, the bridge circuit 44A issues the "ATAPI identify driver" command to the driver circuit 44B again. If the same bridge circuit 44A is adopted by many external devices, the bridge circuit 44A can issue different formats of "identify driver" commands to request the driver circuit of each external device to give individual device configuration data. In the preferred embodiment, the bridge circuit 44A is designed to installed in the external hard disk drive or the external optical drive. The bridge circuit 44A at most issues two kinds of "identify driver" commands (steps 64, 68) to the driver circuit 44B.

Step 70:

If the bridge circuit 44A has received the device configuration data 48B, go to step 72; otherwise, go to step 78.

Step 72:

The bridge circuit 44A has received the device configuration data 48B from the driver circuit 44B. Now, the bridge circuit 44A can check whether the signature code 52 in the device configuration data 48B is valid. As mentioned above, the predetermined signature code 52 is stored in the reserved data space 50 for determining whether the transmission interface data 48A is successfully embedded in the reserved data space 50. If the bridge circuit 44A finds that the retrieved signature code matches the predetermined signature code 52 in step 72, it is safe to proceed to the next step 74 because the transmission interface data 48A has been embedded in the reserved data space 50 correctly. If the bridge circuit 44A finds that the retrieved signature code does not match the predetermined signature code 52 in step 72, it means that the transmission interface data 48A has not been embedded in the reserved data space 50 correctly. Go to step 80.

Step 74:

The bridge circuit 44A extracts the transmission interface data 48A from the device configuration data 48A. In step 74, the bridge circuit 44A realizes that the transmission interface data 48A is recorded in the device configuration data 48B. After receiving the transmission interface data 48A, the host 31 can establish connection with the first external device 40A, and exchanges data with the first external device 40A.

Step 76:

End. After getting the transmission interface data 48A, the host 31 can control the first external device 40A to provide the host 31 with a specific function.

Step 78:

Execute a first exception handling mechanism. The bridge circuit 44A does not receive the transmission interface data from the driver circuit 44B. The bridge circuit 44A generates an error message to the host 31 so that the host 31 then can tell the user that the first external device 40A does not work normally or performs other remedial measures.

Step 80:

Execute a second exception handling mechanism. Though the bridge circuit 44A has received the device configuration data 48B transmitted from the driver circuit 44B, the signature code 52 extracted from the device configuration data 48B shows that the transmission interface data 48A are not embedded in the reserved data space 50 of the device configuration data 48B. The bridge circuit 44A generates an error message to the host 31 for interrupting the whole procedure, or transmits a predetermined transmission interface data to the host 31 so that the host 31 can establish connection with the first external device 40A according to the predetermined transmission interface data.

The bridge circuit 44A according to the present invention not only can use an "identify driver" command to request the driver circuit 44B to retrieve the device configuration data 48B, but also can use a special defined command such as a "write" command to make the driver circuit 44B write the transmission interface data 48A into the memory 46. The host 31 must be able to execute a corresponding driver program such as a window-based driver utility to accomplish the objective of the "write" command. The user can use the driver program to transmit both the "write" command and the corresponding transmission interface data compatible with the first format to the bridge circuit 44A. The bridge circuit 44A then transmits the "write" command and the corresponding transmission interface data compatible with the second format to the driver circuit 44B so that the driver circuit 44B will embed the transmission interface data 48A and the corresponding signature code 52 in the reserved data space 50 of the device configuration data 48B. Therefore, the transmission interface data 48A embedded in the device configuration data 48B are capable of being updated at a user's request.

In contrast to the prior art transmission interface controller, the transmission interface controller according to the present invention uses the reserved data space of the device configuration data to store the transmission interface data. The transmission interface controller according to the present invention, therefore, does not require an extra non-volatile memory to store the transmission interface data. In other words, the external device with a simple circuit design certainly has a lower production cost. Furthermore, the reserved data space of the device configuration data has been defined by a standard specification already, and the transmission interface controller according to the present invention consequently can achieve the objective of lowering the production cost and simplifying the circuit design without affecting original operation of the external device at all.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for controlling a transmission interface between a computer system and an external device to manage data transmission, the computer system comprising:

a host for controlling operation of the computer system; and a first connecting port for outputting and receiving a data compatible with a first format;

the external device comprising:

a second connecting port for receiving the data compatible with the first format transmitted from the first connecting port and transmitting the data compatible with the first format to the first connecting port;

a bridge circuit comprising a first port and a second port, the first port electrically connected to the second connecting port, the bridge circuit transforming the data compatible with the first format received by the first port into corresponding data compatible with a second format and outputting the data compatible with the second format through the second port, the bridge circuit transforming the data compatible with the second format received by the second port into the corresponding data compatible with the first format and outputting the data compatible with the first format through the first port;

a driver circuit for controlling operation of the external device according to the data compatible with the second format outputted from the second port of the bridge circuit; and a memory electrically connected to the driver circuit for storing transmission interface data, the host of the computer system transmitting the data compatible with the first format to the bridge circuit of the external device according to a specification defined by the transmission interface data;

the method comprising:

transmitting a control signal compatible with the second format from the bridge circuit to the driver circuit so that the driver circuit transmits the transmission interface data stored in the memory to the bridge circuit; and transmitting the transmission interface data compatible with the first format from the bridge circuit to the host so that the host transmits data compatible with the first format to the bridge circuit according to the transmission interface data.

2. The method of claim 1 wherein the memory is a non-volatile memory.

3. The method of claim 1 wherein the memory further stores device configuration data, and the host controls the external device according to the device configuration data.

4. The method of claim 3 wherein the device configuration data comprises a reserved data space, and the transmission interface data is stored within the reserved data space.

5. The method of claim 1 wherein the external device is a portable data storage device.

6. The method of claim 5 wherein the external device is a hard disk drive.

7. The method of claim 5 wherein the external device is an IC smart card.

8. The method of claim 5 wherein the external device is an optical drive.

9. The method of claim 1 wherein the first format conforms to a universal serial bus (USB) specification.

10. The method of claim 1 wherein the second format conforms to an AT attachment (ATA) specification.

11. The method of claim 1 wherein the second format conforms to an ATA packet interface (ATAPI) specification.

12. A transmission interface controller used for managing data transmission between an external device and a computer system, the transmission interface controller comprising:

a bridge circuit which has a first port and a second port, the bridge circuit transforming a data compatible with a first format received by the first port into corresponding data compatible with a second format and outputting the data compatible with the second format through the second port, the bridge circuit transforming the data compatible with the second format received by the second port into the corresponding data compatible with the first format and outputting the data compatible with the first format through the first port;

the computer system comprising:

a host for controlling operation of the computer system; and a first connecting port for outputting and receiving the data compatible with the first format;

the external device comprising:

a second connecting port electrically connected to the first connecting port of the computer system and the first port of the bridge circuit for receiving the data compatible with the first format transmitted from the first connecting port and transmitting the data compatible with the first format to the first connecting port;

a driver circuit electrically connected to the second port of the bridge circuit for controlling operation of the external device according to the data compatible with the second format outputted from the second port of the bridge circuit; and a memory electrically connected to the driver circuit for storing transmission interface data, the host of the computer system transmitting the data compatible with the first format to the bridge circuit of the external device according to a specification defined by the transmission interface data;

wherein the bridge circuit transmits a control signal compatible with the first format to the driver circuit so that the driver circuit transmits the transmission interface data stored in the memory to the bridge circuit; and the bridge circuit transmits the retrieved transmission interface data compatible with the first format to the host so that the host transmits data compatible with the first format to the bridge circuit according to the transmission interface data.

13. The method of claim 12 wherein the memory is a non-volatile memory.

14. The transmission interface controller of claim 12 wherein the memory stores device configuration data, and the host controls the external device according to the device configuration data.

15. The transmission interface controller of claim 14 wherein the device configuration data comprises a reserved data space, and the transmission interface data is stored within the reserved data space.

16. The transmission interface controller of claim 12 wherein the external device is a portable data storage device.

17. The transmission interface controller of claim 16 wherein the external device is a hard disk drive.

18. The transmission interface controller of claim 16 wherein the external device is an IC smart card.

19. The transmission interface controller of claim 16 wherein the external device is an optical drive.

20. The transmission interface controller of claim 12 wherein the first format conforms to a universal serial bus (USB) specification.

21. The transmission interface controller of claim 12 wherein the second format conforms to an AT attachment (ATA) specification.

22. The transmission interface controller of claim 12 wherein the second format conforms to an ATA packet interface (ATAPI) specification.

* * * * *